c

(12) United States Patent
Burkhart, Jr.

(10) Patent No.: US 7,190,439 B2
(45) Date of Patent: Mar. 13, 2007

(54) DIRECT READING STADIA ROD FOR USE WITH LASER LEVEL

(76) Inventor: Max E. Burkhart, Jr., 1101 S. E St., McAllen, TX (US) 78501

( * ) Notice: Subject to any disclaimer, the term of this patent is extended or adjusted under 35 U.S.C. 154(b) by 278 days.

(21) Appl. No.: 10/970,006

(22) Filed: Oct. 22, 2004

(65) Prior Publication Data

US 2006/0087641 A1    Apr. 27, 2006

(51) Int. Cl.
*G07C 3/08*    (2006.01)
(52) U.S. Cl. .................................. 356/4.08; 356/4.01
(58) Field of Classification Search ............... 356/4.08
See application file for complete search history.

(56) References Cited

U.S. PATENT DOCUMENTS

| | | | |
|---|---|---|---|
| 3,242,340 A | | 3/1966 | Layne |
| 3,469,919 A | | 9/1969 | Zellner |
| 3,790,277 A | | 2/1974 | Hogan |
| 3,865,491 A | | 2/1975 | Hogan |
| 3,894,230 A | * | 7/1975 | Rorden et al. ............... 356/622 |
| 4,029,415 A | * | 6/1977 | Johnson ..................... 356/4.08 |
| 4,030,832 A | * | 6/1977 | Rando et al. ............... 356/4.08 |
| 4,600,997 A | | 7/1986 | Cain et al. |
| 4,673,287 A | | 6/1987 | Rickus |
| 5,457,890 A | * | 10/1995 | Mooty .......................... 33/294 |
| 5,551,159 A | * | 9/1996 | Mooty .......................... 33/228 |
| 5,551,890 A | * | 9/1996 | Caherec ...................... 439/409 |
| 6,011,628 A | * | 1/2000 | Tullis ......................... 356/399 |
| 6,223,446 B1 | * | 5/2001 | Potter .......................... 33/764 |

* cited by examiner

*Primary Examiner*—Thomas H. Tarcza
*Assistant Examiner*—Timothy Brainard
(74) *Attorney, Agent, or Firm*—Jacobson Holman PLLC

(57) ABSTRACT

A direct-reading stadia rod includes a flexible tape and a sensing head that is movable therealong. The sensing head includes a keyboard, a movement sensor, a laser beam receiver, and a display. The rod is calibrated with a benchmark elevation by placing the base of the tape on a point of known elevation and moving the sensing head along the tape until it is properly aligned with the beam of a remote laser level. With the sensing head fixed at that location on the tape, the benchmark elevation is input using the keyboard. Thereafter, the tape is placed upon a point of unknown elevation, and the sensing head is moved until the laser beam receiver again detects alignment with the laser plane. Based on data from the movement sensor indicated by the sensing head from the benchmark position, the elevation of the second point is automatically determined and displayed.

20 Claims, 6 Drawing Sheets

DIRECT READING STADIA ROD FOR USE WITH LASER LEVEL

BACKGROUND OF THE INVENTION

1. Field of the Invention

The present invention is related to the field of land surveying and more particularly to a stadia rod having an automatic elevation read-out display capability and a method for using the stadia rod.

2. Description of the Related Art

Stadia rods are used by surveyors in conjunction with an optical level or a laser level to determine the differences in vertical elevation from a point of known elevation and to that of another point or points.

The method used for centuries has been to view a stadia rod through an optical level. Markings provided on the stadia rod show exact graduations in a given scale, such as meters or feet, starting at the bottom and increasing incrementally up the rod. For example, if the rod is 8 feet in length, the top of the rod is marked 8'0". Most commonly, surveyor's rods in the U.S. are marked in feet, as well as in tenths and hundredths of a foot. The height on the rod does not typically represent the actual elevation, but is used in the calculation thereof.

In the 20$^{th}$ century, a rod was developed called a Lenker Rod, in which the surface bearing the lineal dimensional graduations is an endless tape, ten feet in length. The tape, which is mounted on a rectangular rod with a recessed track on the front and back to hold the tape, can be moved around the rod by sliding and then mechanically held in a fixed position as desired by the user. The markings are opposite that of a standard stadia rod, i.e., they increase going down the rod. Therefore, when an object having an elevation higher than the established base elevation is recorded, the reading is higher. Conversely, if the object whose elevation is desired is lower than that of the base or known elevation, the reading is lower. All readings are direct but are limited to less than 5'0" because only half of the tape is viewable without starting over in the loop.

In U.S. Pat. No. 4,030,832 to Rando et al., a grade rod with a laser beam generator is used to determine elevations and grades, along with a beam detector with photocells and traveling tape assembly movable with a slider. With the laser beam generator operating at a location remote from the grade rod, the slider moves up and/or down in a search mode until the laser beam activates one of the photocells thereon. The system then enters an automatic tracking mode until the slider is determined to be centered on the beam, at which point the tape assembly on the rod may be read to determine elevation. This grade rod mechanism is highly complex and cumbersome to use.

According to U.S. Pat. No. 3,469,919 to Zellner, an electronic surveying instrument having a sending station is placed at a benchmark location of known elevation where the laser is leveled. A receiver station is placed at a surface location where it is desired to measure the elevation. The stand of the receiver station includes a surveying rod having a stationary member slidingly connected to a reciprocal or sliding member by an adjustable bracket, the sliding member having two antennae. While the sending station transmits a horizontal beam at the benchmark elevation, the sliding member is reciprocated until both of the antennae are activated indicating that the received beam is located at the juxtaposition of the antennae. Indicia on the members, may then be read to determine the height of the beam plane with respect to the surface location, from which elevation may be calculated. This system is also quite complex and does not provide a direct read-out of the elevation. The Zellner patent also requires laser transmission from a benchmark location of known elevation which limits the flexibility of the system.

U.S. Pat. No. 4,673,287 to Rickus includes a laser-optical surveying system that provides a leveling system in which a laser transmitter transmits a horizontal beam to a surveyor's rod which is equipped with a photoelectrically sensitive layer having coding therein for identifying the location, i.e., altitude, on the rod that is activated by the passing laser beam. This altitude information may then be displayed, stored or processed, but is limited to identifying only a given height on the rod, and does not provide a direct read-out of actual elevation.

All of these systems have limitations in terms of automatic elevation display, most of these devices being highly complex and commensurately expensive. Accordingly, a need exists for a system having automatic elevation sensing and display capability in a device that can be conveniently carried and which is simple and inexpensive to use.

SUMMARY OF THE INVENTION

In view of the foregoing, it is an object of the present invention to overcome the difficulties of determining the value of a elevation reading using a stadia rod by providing a device having an automatic sensing head that directly outputs the actual elevation as a readout to the user.

It is another object of the present invention to provide a direct-reading stadia rod for use with a laser level that is easy and inexpensive to use, the stadia rod having a compact sensing head and a retractable tape that can be clipped onto a workman's belt and easily carried.

It is a further object of the present invention to provide a direct-reading stadia rod having a tape and a compact sensing head that can be used in conjunction with a pole for support of the tape.

It is yet another object of the invention to provide an elevation measuring device that is not complex in structure and which can be manufactured at low cost but yet, when properly calibrated at a benchmark elevation, efficiently measures and directly outputs geographic elevation data.

In accordance with these and other objects, the present invention is directed to a direct-reading stadia rod for use with a laser level. The stadia rod includes a pole, rod or flexible tape and a sensing head that is movable therealong. The sensing head includes a keyboard, a movement sensor, a laser beam receiver, a processor and a display screen. When the tape is placed at a point of known elevation and the sensing head is properly aligned with the beam of a remotely located laser level, the laser beam receiver detects the laser plane and emits a signal. Benchmark data indicating the position of the head on the tape corresponding with the laser plane is then input using the keyboard. When the tape is thereafter placed at a second point of unknown elevation, the sensing head is incrementally moved until the laser beam receiver again detects the laser plane and emits a signal. The processor evaluates data from the movement sensor indicating the distance moved by the sensing head from the benchmark position and outputs the actual elevation of the second point to the user on the display.

These and other objects of the invention, as well as many of the intended advantages thereof, will become more readily apparent when reference is made to the following description taken in conjunction with the accompanying drawings. The drawings are not intended to be to scale.

DETAILED DESCRIPTION OF THE PREFERRED EMBODIMENTS

Figure 1:
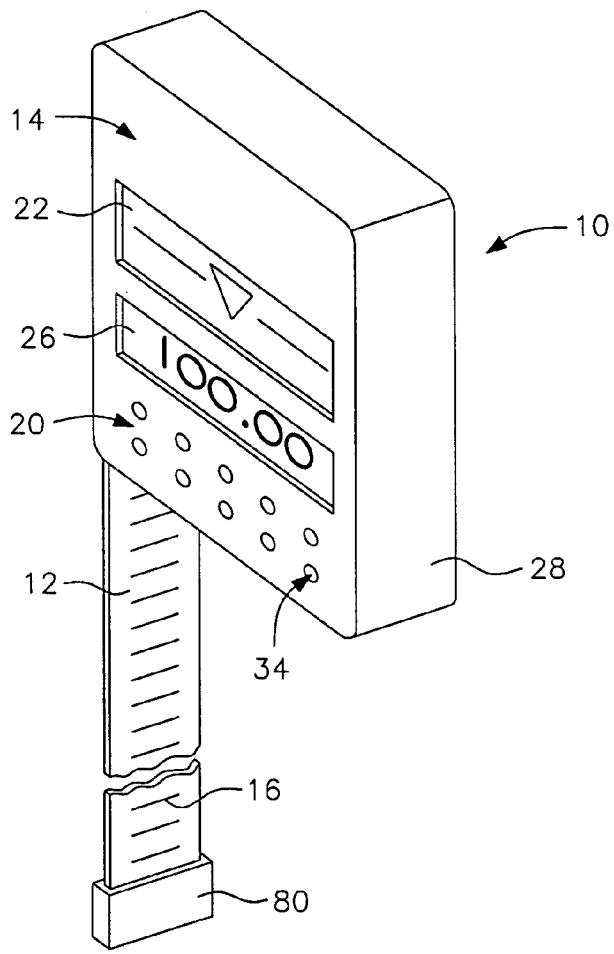
FIG. 1 is an illustration of a stadia rod in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As used herein in connection with the present invention, the term "stadia rod" is used to refer to a device that operates like a surveyor's rod but which may not actually include a "rod" as that term is generally understood. Instead, the "rod" may be a flexible tape or other measuring structure that may be retracted and extended, as well as a fixed length, relatively inflexible structure such as a pole.

Referring to the illustration provided in FIG. 1, the stadia rod according to the present invention, generally designated by the reference numeral 10, includes a rod or tape 12 and a sensing head, generally designated by the reference numeral 14. The tape 12 is provided with a plurality of spaced sensing marks 16 which are detected or read by the sensing head 14 as the latter is moved up and down the tape 12. The spacing of the sensing marks 16 is preferably in feet, tenths of a foot, and hundredths of a foot, although other measuring units such as meters may be used in constructing the tape.

Figure 2:
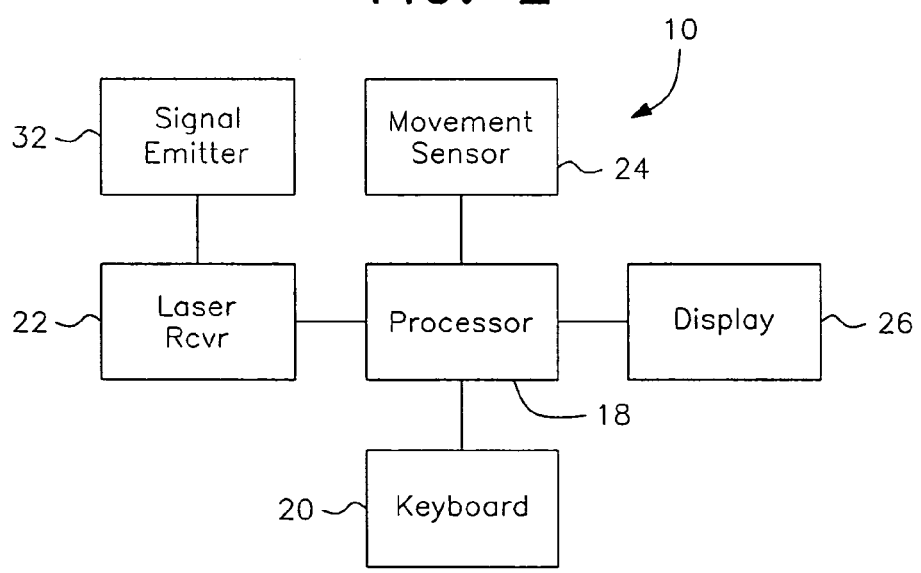
FIG. 2 is a block diagram of the components of the sensing head of the stadia rod of FIG. 1.
Figure 3:
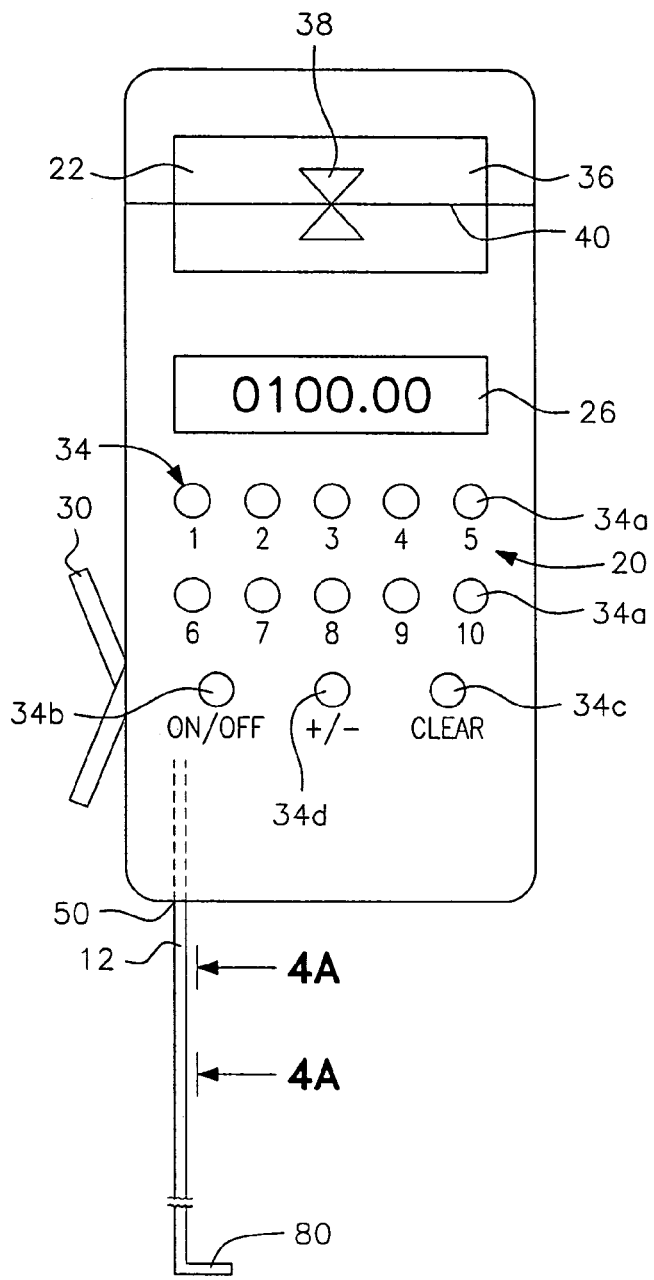
FIG. 3 depicts in greater detail the keyboard, laser beam receiver and display of the sensing head of FIG. 1.

As depicted in FIGS. 2 and 3, the sensing head includes a processor 18, a keyboard 20, a laser beam receiver 22, a movement sensor 24, and a display 26 arranged in a housing 28. The housing 28 is provided with a connecting component to couple the sensing head to the tape.

According to the preferred embodiment shown in FIG. 1, the tape is flexible and can be coiled so as to be extendable and retractable in a manner comparable to that of standard self-retracting measuring tapes. In this embodiment, the connecting component is a reel and spring mechanism (not shown) and the tape, when coiled, is accommodated within the housing 28. A foot or base 80 prevents "loss" of the tape within the housing, allowing for withdrawal of the tape in a known manner. When the tape 12 is uncoiled to extend to a desired length, a position lock element 30 which acts as a mechanical brake serves to secure the sensing head at this point along the tape.

As shown in FIG. 3, the keyboard 20 preferably includes a plurality of input surfaces, generally designated by the reference numeral 34, and may be embodied as a touch-screen or a plurality of keys, buttons, etc., as is generally known in the art of data input devices. The input surfaces 34 preferably include ten numerically valued buttons 34a, an on/off button 34b, a clear button 34c and a sign change button 34d. However, greater or fewer numbers of input surfaces 34 may be used to convey similar information with proper programming of the sensing head.

The numerically valued buttons 34a are used to input benchmark values which may be cleared using the clear button 34c. The use of the on/off button 34b is self evident. The sign change button 34d is used to reverse the numerical input sent to the display 26. Through this reversal capability, the rod can be used upside down for overhead measurements, i.e., measurements above the benchmark, while retaining accurate direct read-out capability.

The laser beam receiver 22 includes a window 36 having a detector 38 for detecting an incoming laser beam and an optical position centering element such as centerline 40 to facilitate exact alignment when using an optical level. The laser beam receiver is a standard off-the-shelf item that is readily available and is generally part of the equipment package provided when purchasing an automatic laser level such as those used in conjunction with the stadia rod of the present invention. The function of the laser beam receiver is to signal the receipt of the laser beam when the receiver is at the same level as the beam.

Figure 4A:
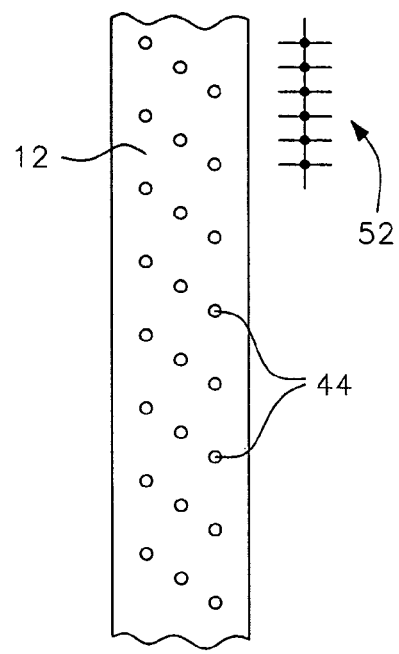
FIG. 4A is a front view of representative optical sensing marks in the form of apertures in the tape in accordance with the present invention.
Figure 4B:
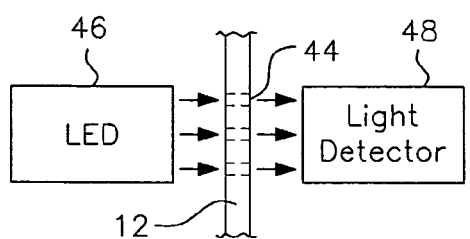
FIG. 4B depicts a side view of the tape of FIG. 4A, along with LEDs and a light detector as may be included in the housing of the sensing head in accordance with the present invention.

The movement sensor 24 detects movements of the sensing head relative to the tape. Movement on the tape is sensed using the sensing marks provided thereon. The sensing marks 16 may be embodied as a plurality of any of various structures for providing measurements, including mechanical, optical, magnetic, RFID, electrical or any other known movement sensing elements. For example, the marks may take the form of apertures 44 in the tape 12, with a spacing 52 of 0.01 feet, which are detected using light emitting diodes (LEDs) 46 and a light detector 48, as shown in FIGS. 4A and 4B. The LEDs and light detector may be included within the housing, preferably adjacent the opening 50 through which the tape passes as it moves into and out of the sensing head.

Figure 4C:
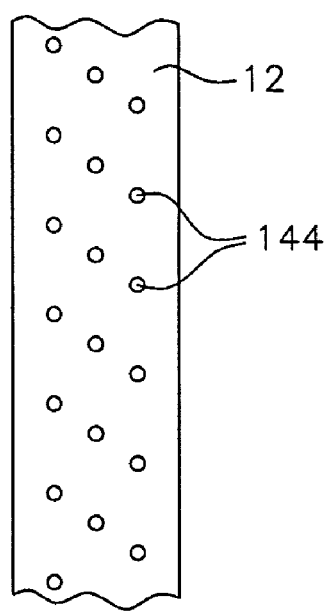
FIG. 4C is a front view of representative mechanical sensing marks in the form of bumps on the tape in accordance with the present invention.
Figure 4D:
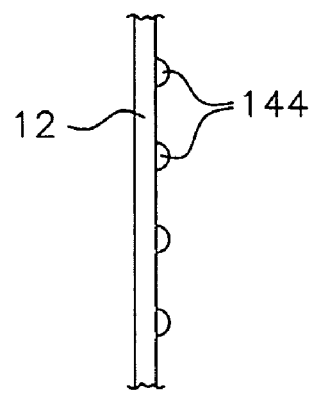
FIG. 4D depicts a side view of the tape of FIG. 4C.
Figure 4E:
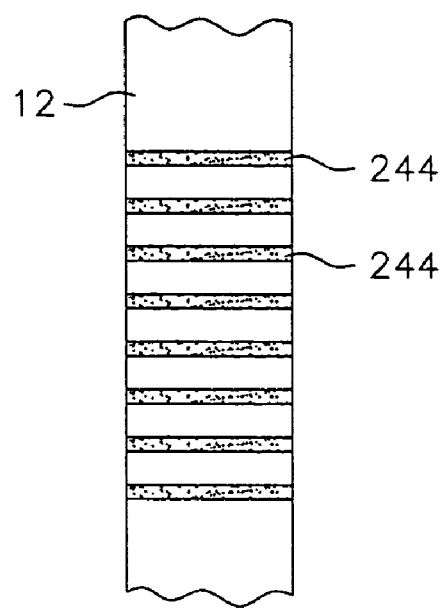
FIG. 4E is a front view of representative magnetic sensing marks in the form of magnetic strips in the tape in accordance with the present invention.
Figure 4F:
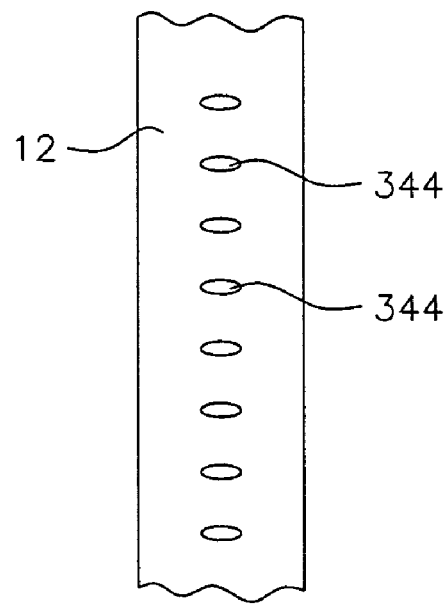
FIG. 4F is a front view of representative electronic sensing marks in the form of RFID tags on the tape in accordance with the present invention.

Alternatively, the sensing marks may be embodied as spaced protrusions or bumps 144 for ratcheted movement of the sensing head along the tape as illustrated in front and side views of the tape in FIGS. 4C and 4D, respectively. The marks may also be magnetic strips 244 as shown in FIG. 4E, the strips being read by a reader as is known in the art. As a further embodiment, the marks may be electronic or radio frequency transmitting elements such as radio frequency identification (RFID) tags 344, as shown in FIG. 4F. Combinations of sensing marks types could also be used, such as alternating magnetic strips and mechanical bumps, or mechanical bumps at tenths and hundredths of a foot. Virtually any type of sensing mark, with the corresponding detector and/or reader device appropriate for such mark being operative in the sensing head, that may be effectively used by the processor to track, on an automated basis, the extent of movement of the sensing head relative to the tape may be used and is intended and considered to be included within the scope of the present invention.

The display 26, which is preferably a LCD screen, displays elevation information including the initial benchmark elevation to ensure accurate input thereof. Errors may be corrected using the clear button 34c, followed by reentry of the desired benchmark elevation using the numerically valued buttons 34a. The sign change button 34d is used to reverse the numerical input sent to the display 26 if heights are to be measured above a benchmark. Once the stadia rod 10 has been initialized with the benchmark elevation, it may be used to determine the elevation of another point of unknown elevation which is then presented to the user on the display 26.

Figure 5:
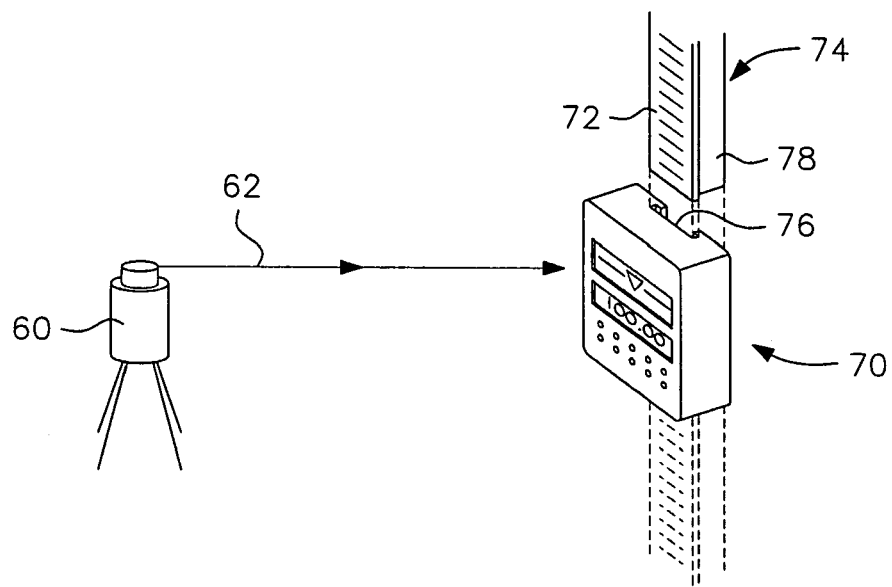
FIG. 5 is an illustration of a further embodiment of the stadia rod with a laser level in accordance with the present invention.
Figure 6:
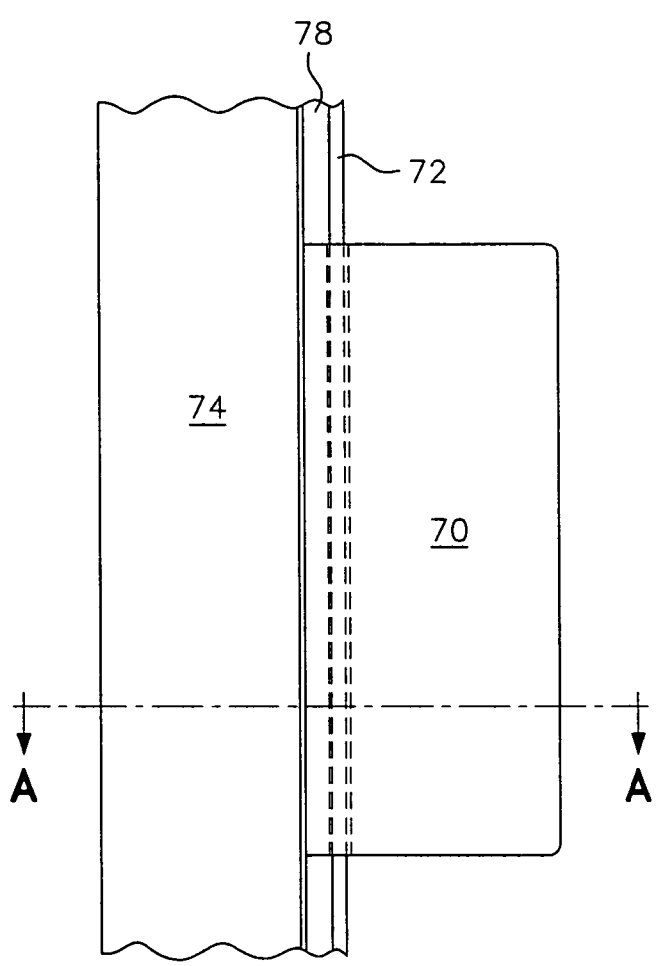
FIG. 6 is a side view of the sensing head as mounted on a pole according to an alternative embodiment of the present invention.
Figure 6A:
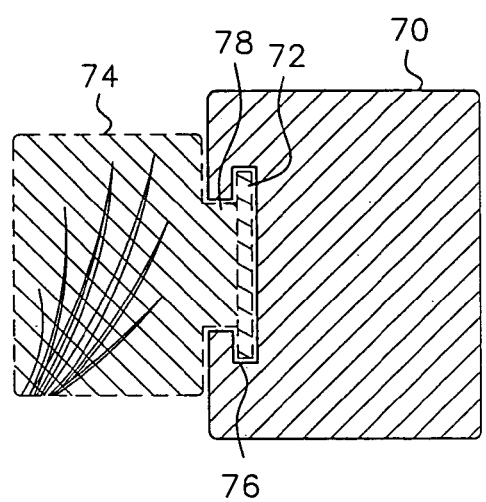
FIG. 6A is a cross-sectional view taken along line A—A of FIG. 6.
Figure 7:
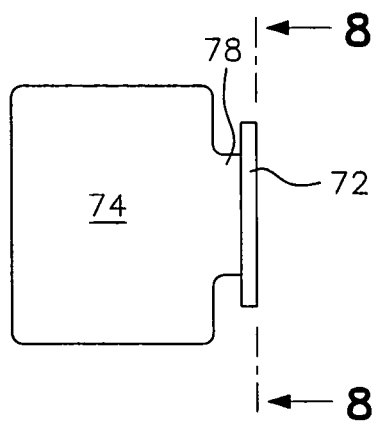
FIG. 7 is a top view of the pole and tape according to the embodiment of FIG. 6.
Figure 8:
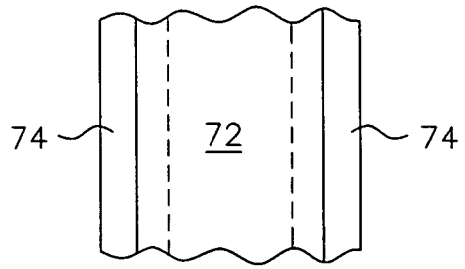
FIG. 8 is a side view taken along line 8—8 of FIG. 7.

While the preferred embodiment of the stadia rod is that of the flexible tape that coils inside the sensing head housing, the sensing head 70 may be used with a separate tape 72 and a pole 74 to which the tape 72 has been connected as shown in FIGS. 5, 6 and 6A. In this embodiment, the connecting component in the sensing head 70 for connecting the housing to the tape includes a recess, channel or groove 76. This groove 76 receives the tape 72 and at least a protruding portion 78 of the pole 74 as shown in FIGS. 6A, 7 and 8. Alternatively, the protruding portion 78 may constitute the entire pole 74 as shown in FIG. 5. The remaining components of the sensing head are as in the embodiment shown in FIGS. 1–3. The pole with connected tape and the sensor head movable thereon are then used as discussed above, with the sensing head being fixed at a desired position using the locking element 30.

Figure 9:
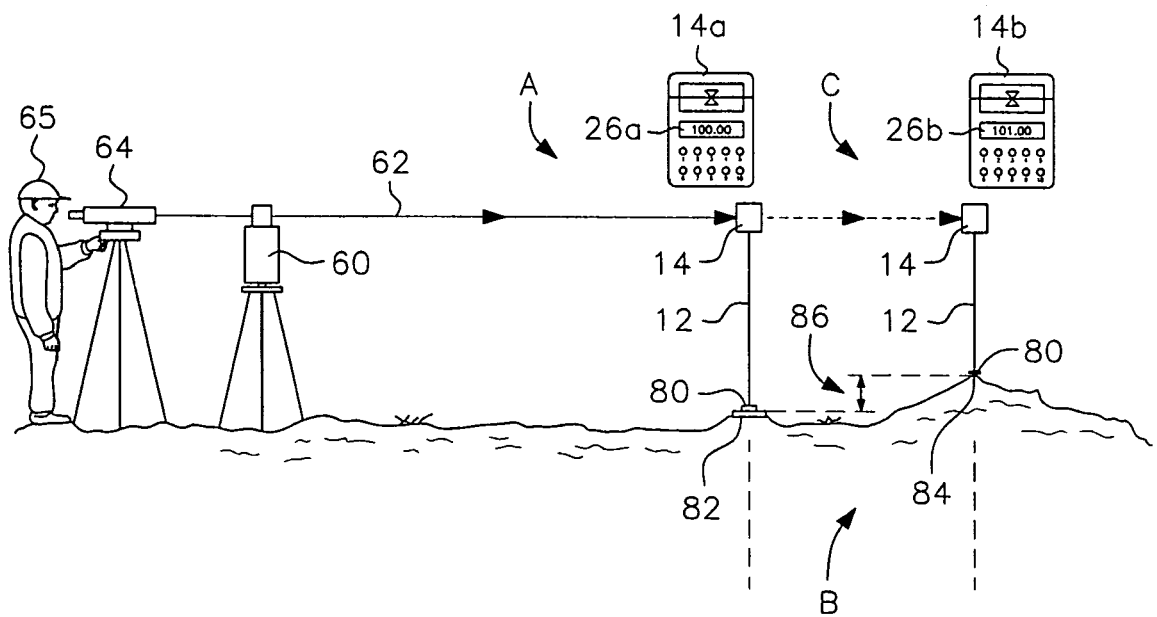
FIG. 9 is a graphical flowchart of the steps undertaken to establish a benchmark elevation and to determine points of unknown elevation using the stadia rod in accordance with the present invention.

The present invention is preferably used in conjunction with a rotating plane, self-leveling laser level 60 which generates a laser beam 62, as shown in FIG. 5. Alternatively, the stadia rod may be used with an optical level 64 as illustrated in FIG. 9. As is known by persons of skill in the art, if an optical level is used then a second person 65 is needed (the first person being the user of the stadia rod). The second person 65, based on visual alignment using the centerline 40, communicates with the user (not shown) when the sensing head has been properly positioned to establish the benchmark.

The use of a laser level is preferred in that, once the 360° rotating laser has been set up and activated to output the laser beam 62, only one person is needed thereafter, i.e., the user who positions the stadia rod. The process as discussed herein is therefore focused on this embodiment, with the understanding that use and operation of both of these levels is well known to persons of ordinary skill in the art.

The stadia rod according to the present invention is of significant utility in both civil engineering and the construction industry, where it is quite often necessary to establish or determine the elevations or grades of objects or terrain using a benchmark elevation. A typical procedure, as would be used to obtain the elevation of several points using the stadia rod as disclosed and claimed herein, is summarized in FIG. 9 and will now be described.

The process for establishing the benchmark elevation is summarized in step A of FIG. 9. As shown, the self-leveling laser level 60 is set up and the tip or base 80 of the tape 12 is placed on the point of known elevation, i.e., the benchmark point 82, which is remotely located from the laser level 60. While making sure that the base 80 of the tape remains in contact with the benchmark point 82, the sensing head is moved along the tape until the laser beam emitted from the remotely located laser level 60 is detected, as indicated by a signal emitted by the laser beam receiver 22. The sensing head is then fixed in that position using the position lock element 30 and the user handling the stadia rod inputs the known elevation using the keyboard. This known elevation value is the benchmark elevation.

At this point, with the sensing head still fixed in its relation to its position on the tape, the benchmark elevation is preferably verified to ensure that it has been properly set. Specifically, as a check, when the tip or base 80 of the tape is again placed on the benchmark point 82, the laser receiver should signal again the receipt of the beam 62, indicating that the tape and the sensor head have been properly set. The benchmark elevation value is also presented on the display. In the example shown in the front view 14a of the sensing head in step A, the benchmark elevation shown in the display 26a is 100 ft.

Once the benchmark elevation has been determined and entered, the tape lock 30 can be released without disturbing the relationship of the sensing head's reading and its tape position. Since the sensing head has been made to add or subtract from the entered benchmark elevation, any movement of the sensing head head, either up or down, does not disturb the calibration. This may be easily verified at any point thereafter by simply placing the tape's end or base 80 back on the benchmark point 82 and moving the sensing head 14 on the tape 12 until the laser beam 62 is detected; if the original benchmark elevation is displayed, the user is assured that proper calibration has been maintained.

To secure the elevation of other points, relative to the benchmark elevation, the user moves to a second location, step B.

At the second location, step C, the user places the tape end or base 80 on the second point 84 for which the elevation is desired. The sensing head is then moved on the tape until the laser beam is detected. As the head is moved, the processor adds or subtracts from the benchmark elevation, based on input from the movement sensor, determining the new elevation dynamically and in real time so that, when the laser beam receiver indicates alignment with the laser plane, the user can instantly read the new elevation directly on the display. If, given the example shown in FIG. 9, the benchmark elevation was 100.00 ft. and the difference 86 from the benchmark to the second point 84 is 1.00 foot higher, then as shown in the front view 14b of the sensing head in step C of FIG. 9, the display 26b on the sensing head will read 101.00 ft. as the elevation of the second point 84.

Because the displayed value is the actual elevation, there is no need, as in the prior art systems, to calculate or convert the elevation from an intermediate value, and therefore there is no opportunity for the introduction of user error in doing so. The sensing head preferably has the ability to accurately record movements on the tape of 0.01 ft., a degree of accuracy sufficient to meet most construction standards.

Even with this degree of accuracy, the ability of the device to meet required accuracy standards is, as always, dependent upon the skill and knowledge of the user. The stadia rod does, however, have the advantage of speed in less critical areas of work such as topographic surveys.

Figure 10A:
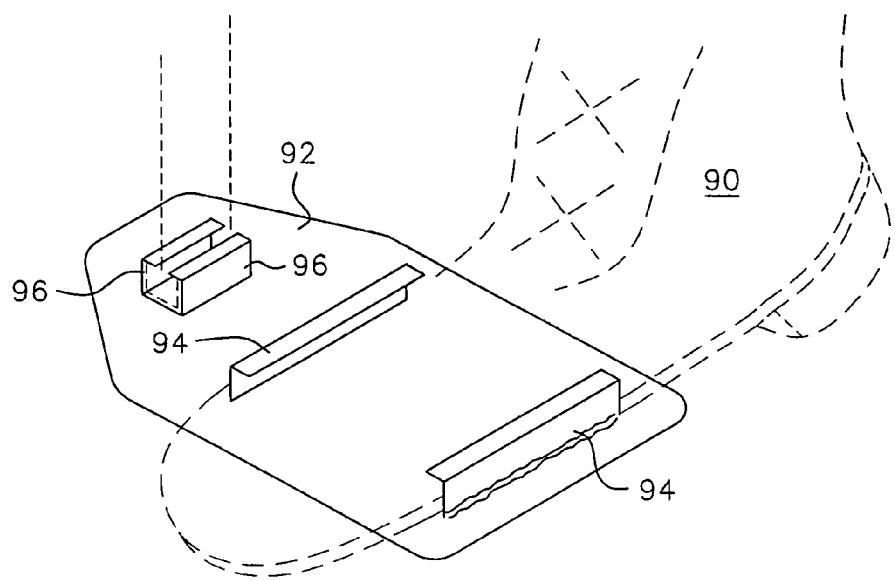
FIG. 10A illustrates a boot-mounting plate with attachment elements according to the present invention.
Figure 10B:
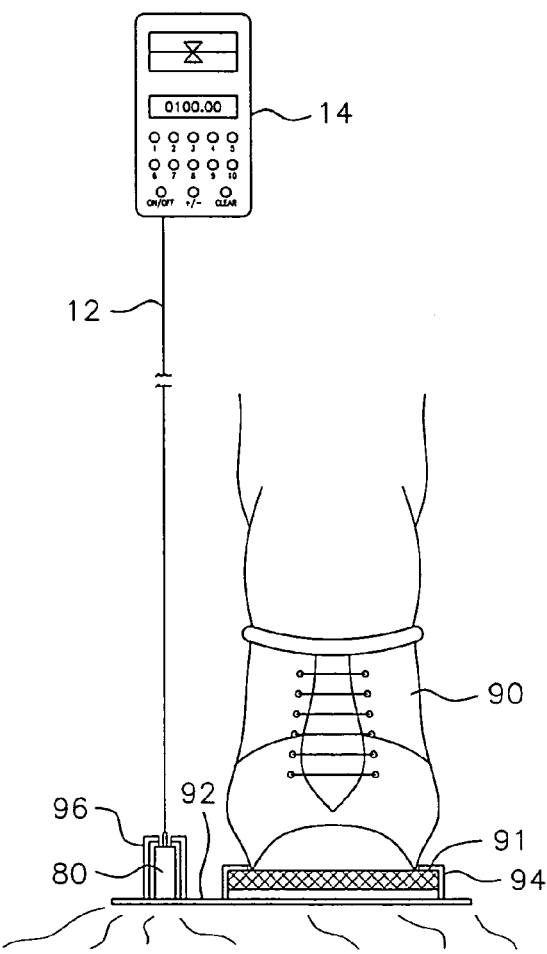
FIG. 10B depicts the plate of FIG. 10A with the user's boot and the stadia rod attached thereto in accordance with the present invention.

More specifically, as illustrated in FIGS. 10A and 10B, rough "first topo surveys" can be made with the tape's tip or base 80 held in a position generally corresponding to the bottom of the user's field boots 90. This is accomplished by using a flat plate 92 having boot attachment elements 94 that can be of various constructions but which serve to removably couple the user's boot to the stadia rod 10. The base 80 of the tape 12 is also removably secured to the plate 92 by tape attachment elements 96. The attachment elements 94, 96 may be spring clips that grip the boot sole 91 and the tape base 80, respectively, when the sole and base are inserted therebetween. The exact construction of these attachment elements is within the scope of those of ordinary skill in the art.

With the plate 92 coupled to the user's boot 90 and to the base 80 of the stadia rod tape 12, the user has only to plant his/her foot on a point for which elevation is desired and, when the sensing head is raised or lowered so as to detect the laser beam, the corresponding elevation is automatically displayed as a direct read-out on the sensing head. The accuracies which can be obtained in this way, being on the order of 0.1 ft., are acceptable in preparation for work using bulldozers.

According to the preferred embodiment, the tape of the stadia rod is similar in size to an average contractor-grade retractable steel measuring tape, representatively about 3" by 3.25" by 1.5" with a weight of about one-half pound. Thus, a project superintendent can easily and conveniently carry the device on his belt, ready for use throughout the day. Once set to proper elevation in the morning, elevations can be easily and quickly verified as long as the datum laser that was used to establish the benchmark elevation remains undisturbed. The alternative embodiment using the pole is also readily carried, the pole being light in weight and easily handled.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A stadia rod comprising:
    a tape having a plurality of sensing marks spaced therealong; and
    a sensing head movable along said tape, said sensing head including,
        a laser beam receiver for detecting a laser beam output from a remotely positioned laser level and for outputting an indication when aligned with said laser beam;
        a keyboard for inputting data to the sensing head, said data including a benchmark elevation value;
        a movement sensor for detecting movement of the sensing head along the tape using the plurality of sensing marks, said movement being detected as an increase or as a decrease with respect to said benchmark elevation value;
        a processor for determining, on an automated basis, a subsequent elevation value based on data received from said movement sensor; and
        a display for presenting said subsequent elevation value to a user as a direct reading of actual elevation.

2. The stadia rod as set forth in claim 1, wherein said keyboard includes a plurality of input surfaces.

3. The stadia rod as set forth in claim 1, wherein said plurality of sensing marks includes apertures in said tape that are detected using an LED and a light detector within said sensing head.

4. The stadia rod as set forth in claim 1, wherein said plurality of sensing marks includes a plurality of protrusions for effecting ratcheted sensing movement of said sensing head on said tape.

5. The stadia rod as set forth in claim 1, wherein said plurality of sensing marks includes a plurality of magnetic strips.

6. The stadia rod as set forth in claim 1, wherein said plurality of sensing marks includes a plurality of spaced RFID tags.

7. The stadia rod as set forth in claim 2, wherein said plurality of input surfaces includes a plurality of buttons for entering numeric values.

8. The stadia rod as set forth in claim 2, wherein said plurality of input surfaces further includes a button for reversing a sign of numeric input to said display.

9. The stadia rod as set forth in claim 1, wherein said laser beam receiver, said keyboard, said movement sensor, said processor and said display are mounted in a housing, said tape being flexible and coiling to fit within said housing.

10. The stadia rod as set forth in claim 9, wherein said housing with said tape coiled therein is sized to be clipped to a user's belt and carried like an average contractor-grade retractable steel measuring tape.

11. The stadia rod as set forth in claim 1, wherein said tape is connected to a pole and said sensing head includes a channel for receiving said tape and at least part of said pole for sliding movement thereon.

12. A stadia rod comprising:
    a tape having a plurality of sensing marks spaced therealong; and
    a sensing head movable along said tape, said sensing head including,
        a laser beam receiver for detecting a laser beam output from a remotely positioned laser level and including a visible center line for use with said remotely positioned optical level;
        a keyboard for inputting data to the sensing head, said data including a benchmark elevation value;
        a movement sensor for detecting movement of the sensing head along the tape using the plurality of sensing marks, said movement being detected as an increase or as a decrease with respect to said benchmark elevation value;
        a processor for determining, on an automated basis, a subsequent elevation value based on data received from said movement sensor; and
        a display for presenting said subsequent elevation value to a user as a direct reading of actual elevation.

13. The stadia rod as set forth in claim 12, wherein said keyboard includes a plurality of input surfaces including a plurality of buttons for entering numeric values and a button for reversing a sign of numeric input to said display.

14. The stadia rod as set forth in claim 12, wherein said plurality of sensing marks includes apertures in said tape that are detected using an LED and a light detector within said sensing head.

15. The stadia rod as set forth in claim 12, wherein said plurality of sensing marks includes a plurality of protrusions for effecting ratcheted sensing movement of said sensing head on said tape.

16. The stadia rod as set forth in claim 12, wherein said plurality of sensing marks includes a plurality of magnetic strips.

17. The stadia rod as set forth in claim 12, wherein said plurality of sensing marks includes a plurality of spaced RFID tags.

18. The stadia rod as set forth in claim 12, wherein said laser beam receiver, said keyboard, said movement sensor, said processor and said display are mounted in a housing, said tape being flexible and coiling to fit within said housing such that said housing with said tape coiled therein is sized to be clipped to a user's belt and carried like an average contractor-grade retractable steel measuring tape.

19. The stadia rod as set forth in claim 12, wherein said tape is connected to a pole and said sensing head includes a channel for receiving said tape and at least part of said pole for sliding movement thereon.

20. A method of obtaining a direct reading of actual elevation using a stadia rod and a laser level, said stadia rod having a tape with a plurality of sensing marks spaced therealong and a sensing head movable along said tape, said sensing head including a laser beam receiver, a keyboard, a movement sensor, a processor and a display, said method comprising the steps of:

activating the laser level to emit a 360° laser beam;

placing an end of the tape on a point of known elevation remotely positioned from said laser level, said point of known elevation being a benchmark elevation;

moving the sensing head along the tape until a point is reached at which the laser beam receiver signals detection of the laser beam emitted from said laser level and alignment therewith;

inputting the benchmark elevation to said sensing head using said keyboard while keeping said sensing head at said point on said tape, said benchmark elevation henceforth corresponding with said point on said tape;

moving said stadia rod to a second point of unknown elevation;

placing the end of the tape on said second point remotely positioned from said laser level;

moving the sensing head along the tape until the laser beam receiver signals detection of the laser beam emitted from said laser level and alignment therewith, said movement sensor detecting said movement of the sensing head along the tape as an increase or as a decrease with respect to said benchmark elevation;

determining, by said processor on an automated basis, a subsequent elevation value of said second point based on data received from said movement sensor; and displaying on an automated basis said subsequent elevation value as a direct reading of actual elevation of said second point.

\* \* \* \* \*